US011258389B2

(12) United States Patent
Xu et al.

(10) Patent No.: US 11,258,389 B2
(45) Date of Patent: Feb. 22, 2022

(54) POWER TOOL AND CONTROL METHOD THEREOF

(71) Applicant: Nanjing Chervon Industry Co., Ltd., Nanjing (CN)

(72) Inventors: Yanqing Xu, Nanjing (CN); Hongwei Wang, Nanjing (CN); Xiaogang Ding, Nanjing (CN); Tiantian Yin, Nanjing (CN); Dezhong Yang, Nanjing (CN); Xiubo Dai, Nanjing (CN); Wenqi Zhen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/015,852

(22) Filed: Sep. 9, 2020

(65) Prior Publication Data
US 2020/0412286 A1    Dec. 31, 2020

Related U.S. Application Data

(63) Continuation of application No. PCT/CN2019/080085, filed on Mar. 28, 2019.

(30) Foreign Application Priority Data

Mar. 28, 2018 (CN) .......................... 201810265633.3
Mar. 28, 2018 (CN) .......................... 201810265661.5

(51) Int. Cl.
*H02P 21/10* (2016.01)
*H02P 21/18* (2016.01)
(Continued)

(52) U.S. Cl.
CPC ................ *H02P 21/10* (2013.01); *B25F 5/02* (2013.01); *H02P 21/18* (2016.02); *H02P 21/22* (2016.02); *H02P 27/12* (2013.01)

(58) Field of Classification Search
CPC .......... H02P 21/10; H02P 21/18; H02P 21/22; H02P 27/12; B25F 5/02
See application file for complete search history.

(56) References Cited

U.S. PATENT DOCUMENTS 5,195,410 A      3/1993  Young
9,473,058 B2 *  10/2016  Ogi ......................... H02P 21/22
(Continued)

FOREIGN PATENT DOCUMENTS

CN      102271865 A    12/2011
CN      103348581 A    10/2013
(Continued)

OTHER PUBLICATIONS

ISA/CN, International Search Report issued on PCT application No. CN2019/080085, dated Jul. 3, 2019, 2 pages.
(Continued)

*Primary Examiner* — Bickey Dhakal
(74) *Attorney, Agent, or Firm* — Greenberg Traurig, LLP

(57) ABSTRACT

A controller of a power tool is configured to, based on a sampled current of a motor of the power tool, output control signals that change with a change of a position of a rotor of the motor to control a drive circuit of the power tool such that an input voltage and/or a current of the motor changes approximately in a sine wave.

7 Claims, 11 Drawing Sheets

(51) Int. Cl.
*H02P 21/22* (2016.01)
*B25F 5/02* (2006.01)
*H02P 27/12* (2006.01)

(56) References Cited

U.S. PATENT DOCUMENTS

| | | | | |
|---|---|---|---|---|
| 2006/0132074 A1* | 6/2006 | Yang | ............ | H02P 21/06 |
| | | | | 318/437 |
| 2009/0195197 A1* | 8/2009 | Nishimura | ............ | B60L 15/025 |
| | | | | 318/400.09 |
| 2014/0112801 A1* | 4/2014 | Kozaki | ............ | H02P 6/185 |
| | | | | 417/44.11 |
| 2016/0276966 A1* | 9/2016 | Tian | ............ | H02P 21/34 |
| 2017/0294819 A1* | 10/2017 | Crosby | ............ | B25F 5/008 |
| 2018/0194391 A1* | 7/2018 | Parette | ............ | B62D 5/0487 |
| 2019/0052198 A1* | 2/2019 | Hano | ............ | H02P 6/28 |
| 2019/0253014 A1* | 8/2019 | Iwaji | ............ | H02P 27/08 |
| 2019/0319560 A1* | 10/2019 | Shi | ............ | H02P 6/17 |

FOREIGN PATENT DOCUMENTS

| | | |
|---|---|---|
| CN | 105209222 A | 12/2015 |
| JP | 2011004515 A | 1/2011 |

OTHER PUBLICATIONS

EPO, extended European search report issued on European patent application No. 19775305.6, dated Apr. 9, 2021, 8 pages.

Anton et al., Substitution of the Universal Motor Drives With Electrolytic Capacitorless PMSM Drives In Home Appliances, dated Jun. 2015, 7 pages.

* cited by examiner (a)

(b)

(a)

(b)

(c)

POWER TOOL AND CONTROL METHOD THEREOF

RELATED APPLICATION INFORMATION

The present application is a continuation of International Application Number PCT/CN2019/080085, filed on Mar. 28, 2019, the disclosure of which is incorporated herein by reference in its entirety. Further, this application claims the priority of Chinese Patent Application No. 201810265661.5, filed on Mar. 28, 2018 and Chinese Patent application number 201810265633.3, filed on Mar. 28, 2018 in the SIPO (State Intellectual Property Office—Chinese Patent Office), the disclosures of which are incorporated herein in their entirety by reference.

TECHNICAL FIELD

The present disclosure relates to a power tool and a control method thereof, in particular to a power tool and a control method thereof that can improve motor speed and heavy-load performance.

BACKGROUND

Existing power tools generally use a traditional square wave to drive the internal motor and control the motor speed and torque by adjusting the duty cycle of the square wave signal.

For a brushless DC motor, in the traditional square wave control method, in order to make the brushless motor rotate, a drive circuit has multiple drive states. In each drive state, stator windings of the brushless motor generate a magnetic field. A controller is configured to output a corresponding drive signal to the drive circuit based on the rotational position of a rotor in order to switch between the drive states of the drive circuit, thereby changing the voltage applied to the stator windings of the brushless motor and creating an alternating magnetic field to drive the rotor to rotate, so as to drive the brushless motor.

For a brushless motor, under the traditional square wave modulation control method, in an electrical cycle, the brushless motor has only six states, in other words, a stator has six current states (a three-phase bridge arm has six switching states). Each current state can be regarded as a vector torque that compounds into one direction. The six vectors are converted regularly and one by one so as to drive a rotor to rotate, and the motor rotor will rotate synchronously.

The traditional square wave control is simple to implement, but due to only six vector torques, it makes the motor efficiency and the overall machine efficiency low, further, stall might happen frequently under heavy load.

In addition, the traditional square wave control method hinders further speed up after the motor speed reaches a certain level, whereas under light load, it is a common desire for the speed to be as high as possible. A general solution to this problem is to use mechanical structures to adjust speed by configuring different gear ratios, but relying on mechanical structures, the speed adjustment range is largely limited by the motor. Mechanical gear structures will also increase the weight of the whole machine and affect usage.

SUMMARY

In order to solve the deficiencies of the prior art, the purpose of the present disclosure is to provide a power tool and a control method thereof that can improve the motor speed and heavy-load performance.

In order to achieve the above goals, the present disclosure adopts the following technical solutions:

A power tool, including: a functional element for realizing a function of the power tool; a motor operatively connected with the functional element, and configured to output power to drive the functional element to work, the motor having a rotor; a drive circuit electrically connected to the motor for driving the motor to output power; and a controller electrically connected to the drive circuit for outputting control signals to control the drive circuit; wherein that the controller is configured to, based on a sampled current of the motor, output control signals that change with the change of a position of the rotor to control the drive circuit such that an input voltage and/or a current of the motor changes approximately in a sine wave.

Optionally, the controller includes a signal processing module enabled to obtain a first feedback current and a second feedback current based on the sampled current of the motor, the first feedback current being related to a torque of the motor, and the second feedback current being related to a magnetic field strength of a stator.

Optionally, the signal processing module further includes: a speed estimation unit configured to estimate a current speed of the motor based on the sampled current of the motor; a target speed setting unit configured to set a target speed of the motor; and a speed comparison and adjustment unit configured to compare the current speed of the motor with the target speed of the motor, and make adjustments based on a comparison result to obtain a first target current and/or a second target current.

Optionally, the signal processing module further includes a two-axis target current allocation unit configured to, based on the comparison result of the speed comparison and adjustment unit, automatically allocate the first target current and the second target current following a principle of maximum torque per unit current.

Optionally, the signal processing module further includes: a first current comparison and adjustment unit configured to compare the first feedback current with the first target current, and make adjustments based on the comparison result to obtain a first target voltage; and a second comparison and adjustment unit configured to compare the second feedback current with the second target current, and make adjustments based on the comparison result to obtain a second target voltage.

Optionally, the signal processing module further includes: a maximum voltage comparison and decision unit configured to generate a target voltage applied to the motor based on the first target voltage and the second target voltage, compare the target voltage with a maximum allowable voltage, and based on the comparison result, determine whether the target voltage is greater than or equal to the maximum allowable voltage; and a voltage regulator, if the target voltage is greater than or equal to the maximum allowable voltage, configured to make voltage adjustments based on the comparison result to obtain the second target current and output the second target current to the second current comparison and adjustment unit, the second target current being less than zero.

A control method of a power tool, the power tool including: a motor configured to output power to drive a functional element to work, the motor having a rotor and a stator; a drive circuit electrically connected to the motor for driving the motor to output power; and a controller electrically connected to the drive circuit for outputting control signals to control the drive circuit. The control method comprising: setting the target speed of the motor; obtaining a sampled current of the motor; and based on the sampled current of the motor, outputting control signals that change with the change of a position of the rotor to control the drive circuit such that an input voltage and/or a current of the motor changes approximately in a sine wave.

Optionally, the control method of the power tool further includes: obtaining a first feedback current related to a torque of the motor and a second feedback current related to a magnetic field strength of the stator based on the sampled current of the motor; estimating a current speed of the motor based on the sampled current of the motor or detecting the current speed of the motor based on a speed detection device; obtaining at least a first target current based on the current speed and the target speed of the motor, the first target current being related to the torque of the motor; obtaining a second target current, the second target current being related to the magnetic field strength of the stator; obtaining a first target voltage based on the first feedback current and the first target current; obtaining a second target voltage based on the second feedback current and the second target current; obtaining a target voltage applied to the motor based on the first target voltage and the second target voltage; and generating PWM signals based on the acquired target voltage applied to the motor to control the drive circuit.

Optionally, the control method of the power tool further includes: performing comparison and adjustments based on the current speed and the target speed of the motor and allocating the first target current and the second target current to achieve maximum torque per unit current based on a result of comparison and adjustments.

Optionally, the control method of the power tool further includes: comparing and determining whether the target voltage applied to the motor is greater than or equal to a maximum allowable voltage allowed by a power supply device that powers the power tool and the power tool; if the target voltage is greater than or equal to the maximum allowable voltage, adjustment is performed based on a result of comparison between the target voltage and the maximum allowable voltage to obtain the second target current; the second target current being less than or equal to zero.

The present disclosure is advantageous in that: the power tool and the control method thereof enable the power tool to have small torque fluctuations, high heavy-load efficiency, and good dynamic response.

DETAILED DESCRIPTION

The present disclosure will be specifically introduced with reference to the drawings and specific examples.

A power tool of the present disclosure may be a hand-held power tool, a garden tool, a garden vehicle such as a vehicle-type lawn mower, which is not restricted herein. A power tool 10 of the present disclosure includes but is not limited to the following: a screwdriver, an electric drill, a wrench, an angle grinders and any other power tool that requires speed adjustment, a sander and any other power tool that may be used to polish a workpiece, a reciprocating saw, a circular saw, and a curved saws, and any other power tool that may be used to cut a workpiece; an electric hammer, and any other power tool that may be used for impact. These tools may also be garden tools, such as pruners, chain saws, and vehicle-type lawn mowers; in addition, these tools may also be used for other purposes, such as mixers. As long as these power tools can adopt the essential content of the technical solutions disclosed below, they fall within the protection scope of the present disclosure.

Figure 1:
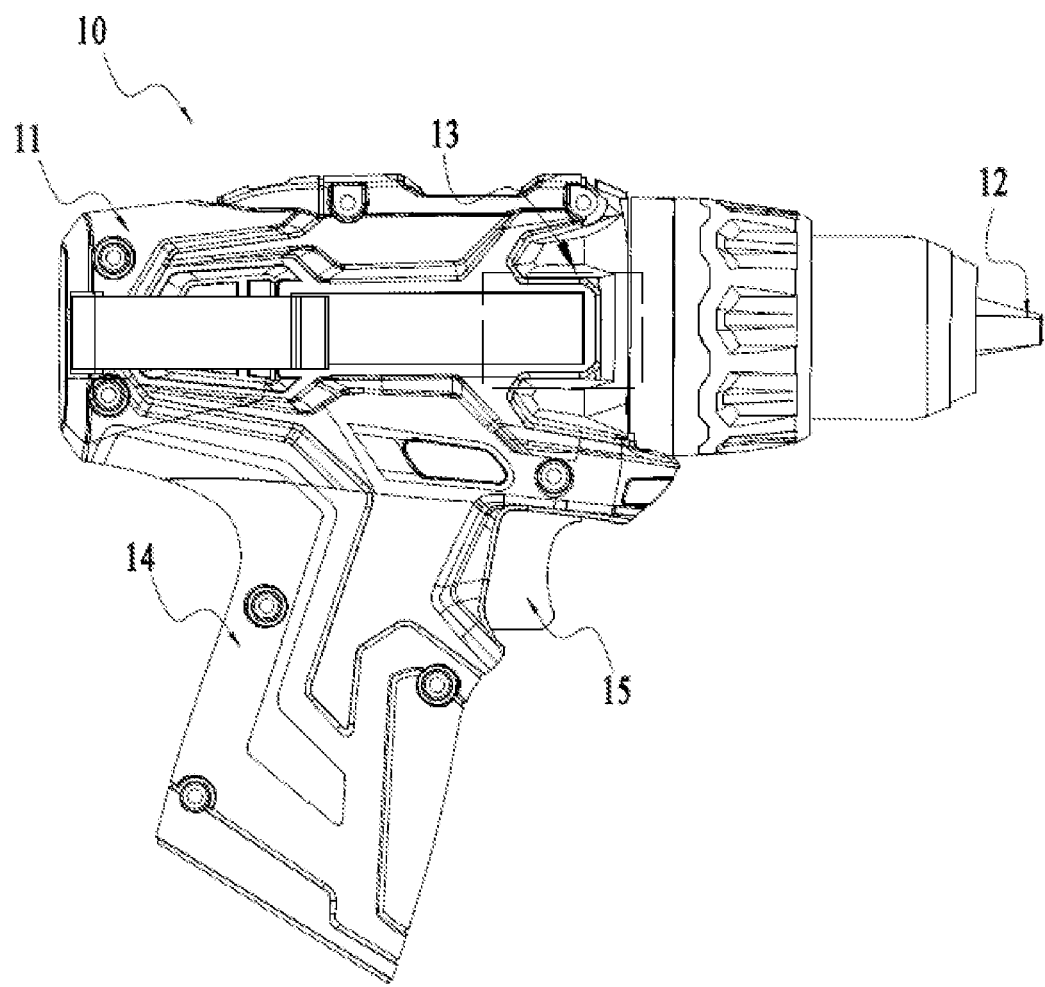
FIG. 1 is a power tool of an example.

Referring to FIG. 1, in an example, the power tool 10 includes: a housing 11, a functional element 12, a motor 13, a handle 14, a circuit board and the electronic components provided on the circuit board.

The functional element 12 is used to realize the function of the power tool 10, such as grinding and cutting. The functional element 12 can be connected to the motor 13 through a tool attachment shaft. Different power tools have different functional elements. For example, for an electric drill, the functional element 12 is a drill bit; for a circular saw, the functional element 12 is a grinding disc.

The motor 13 is operatively connected with the functional element 12 to output driving force that drives the functional element 12 to work. Specifically, the motor 13 includes a rotor, a stator, and a motor shaft. The tool attachment shaft and the motor shaft can be connected through a transmission device, so that the driving force of the motor shaft is transmitted to the tool attachment shaft. The tool attachment shaft is also connected with the functional element, so that the motor can drive the functional element 12 to work. In this example, the motor 13 is a brushless motor that has three-phase windings, and the three-phase windings are wound around the stator.

The handle 14 is for a user to hold. The handle 14 may be an independent part or formed by the housing 11.

In some examples, the power tool 10 may also include an operating member 15. The operating member 15 provided in the handle 14 is used to start or stop the motor 13. The motor 13 starts when the operating member 15 is triggered, and the motor 13 stops when the operating member 15 is released.

Figure 2:
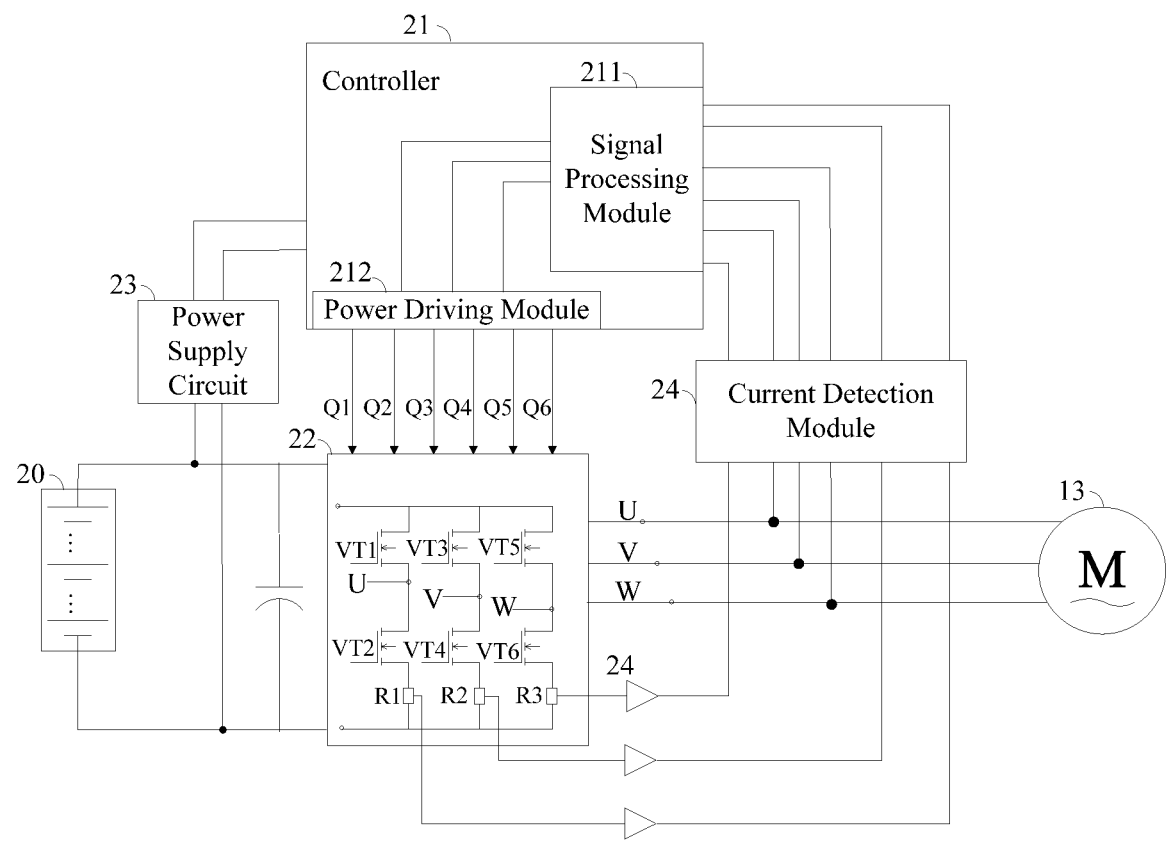
FIG. 2 is a circuit block diagram of a power tool of an example.

The operation of the power tool 10 also relies on various circuit components or electronic components. Referring to FIG. 2, the power tool 10 further includes a controller 21, a drive circuit 22, a power supply circuit 23, and a current detection module 24.

The power tool 10 uses a power supply device 20 to supply power. In some examples, the power supply device 20 outputs AC power, whereas in some examples, the power supply device 20 outputs DC power. The power supply device 20 may be, but is not limited to, a battery pack, and the battery pack is detachably mounted to the power tool 10.

The controller 21, the drive circuit 22, the power supply circuit 23, the current detection module 24, the power supply device 20, and the motor 13 are electrically connected to construct a motor drive system.

The current detection module 24 is used for detecting the operating current of the motor 13 and said current may be bus current or the phase current of the motor. The power supply circuit 23 can be electrically connected with the power supply device 20 to convert the electric energy from the power supply device 20 into the electric energy used by the power tool 10; it is electrically connected to the controller 21 and can at least supply power to the controller 21.

The controller 21 is electrically connected to the drive circuit 22 to output drive signals to control the operation of the drive circuit 22. In some examples, the controller 21 uses a dedicated controller chip (for example, MCU, Microcontroller Unit). The controller 21 includes a signal processing module 211 and a power driving module 212 inside. The signal processing module 211 is configured to process acquired sampled current signals of the motor, and perform functions like calculation, comparison, and decision making. After the signal processing module 211 processes the signals, it generates and outputs control signals to the power driving module 212. The power driving module 212 is connected to the signal processing module 211, and the power driving module 212 improve the driving capability of the output signals of the power driving module 212 to be able to drive the drive circuit 22 to work. The power driving module 212 may also be realized as an external power driving module 212.

The drive circuit 22 is electrically connected to the controller 21 and the motor 13 and can drive the motor 13 to operate based on the control signals output by the power driving module 212 of the controller 21. Specifically, the drive circuit 22 is electrically connected to the three-phase windings of the motor 13. The drive circuit 22 specifically includes a switching circuit for driving the rotor of the motor 13 to operate based on the control signals of the controller 31.

The drive circuit 22 has multiple drive states in order to make the motor 13 rotate. In each drive state, the stator windings of the motor generate a magnetic field. The controller 21 is configured to output corresponding drive signals to the drive circuit 22 based on the rotational position of the rotor of the motor. In this way, the drive circuit 22 can switch between the drive states, thereby changing the voltage and/or current applied to the stator windings of the motor 13, and creating an alternating magnetic field to drive the rotor to rotate, so as to drive the brushless motor. The rotor position of the motor 13 can be obtained by calculation of the signal processing module 211 in the controller 21 from current and/or voltage samples of the motor.

The drive circuit 22 shown in FIG. 2 includes switching elements VT1, VT2, VT3, VT4, VT5, and VT6. The switching elements VT1, VT2, VT3, VT4, VT5, and VT6 form a three-phase bridge circuit, of which VT1, VT3, VT5 are upper bridge switches, and VT2, VT4, VT6 are lower bridge switches. The upper bridge switch and the lower bridge switch of each phase of the bridge circuit are connected with the same winding. The switching elements VT1-VT6 may be field effect transistors, IGBT transistors, etc. The gate of each switching element is electrically connected to the power driving module 212 of the controller 21, and the drain or source of each switching element is electrically connected to the winding of the motor 13. The switching elements VT1-VT6 change the connection state based on the drive signals output by the controller 21, thereby changing the voltage and/or current applied to the winding of the electric motor 13 by the power supply device 20 and driving the motor 13 to operate.

For a brushless motor, under the traditional square wave modulation control method, in an electrical cycle, the brushless motor has only six states, in other words, a stator has six current states (a three-phase bridge arm has six switching states). Each current state can be regarded as a vector torque that compounds into one direction. The six vectors are converted regularly and one by one so as to drive a rotor to rotate, and the motor rotor will rotate synchronously.

The traditional square wave control is simple to implement, but due to only six vector torques, it makes the motor efficiency and the overall machine efficiency low, further, stall might happen frequently under heavy load, reducing heavy load ability.

In addition, the traditional square wave control method hinders further motor speed up after the voltage applied to the motor 13 reaches a maximum allowable voltage, whereas under light load, it is a common desire for the motor speed to be as high as possible. A general solution to this problem is to use mechanical structures to adjust speed by configuring different gear ratios, but relying on mechanical structures, the speed adjustment range is largely limited by the motor. Mechanical gear structures will also increase the weight of the whole machine and affect usage.

To this end, the present disclosure provides a motor control method that output control signals, based on a sampled current of the motor, that change with the rotor position to control the drive circuit 22, such that the input voltage and/or current of the motor 13 approximates a sine wave to enable the motor with more current states. The more current states can be compounded into multiple vector torques with approximately continuous directions. These multiple vector torques move approximately along a circumference, and the rotor of the motor follows and rotates synchronously with these multiple vector torques that move approximately along the circumference, thereby improving the efficiency of the whole machine.

Figure 3:
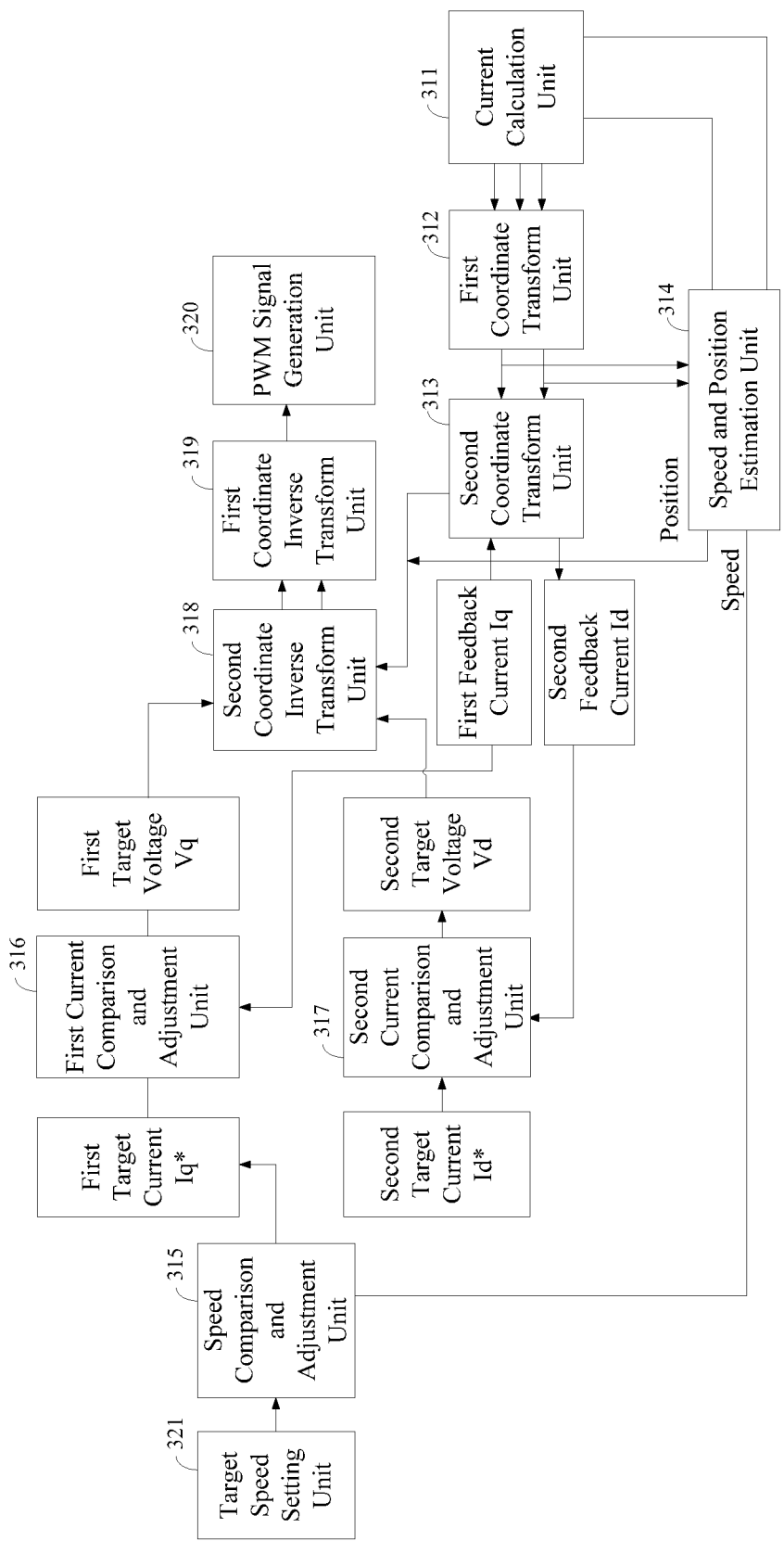
FIG. 3 is a signal processing module of a controller of a first example.
Figure 5:
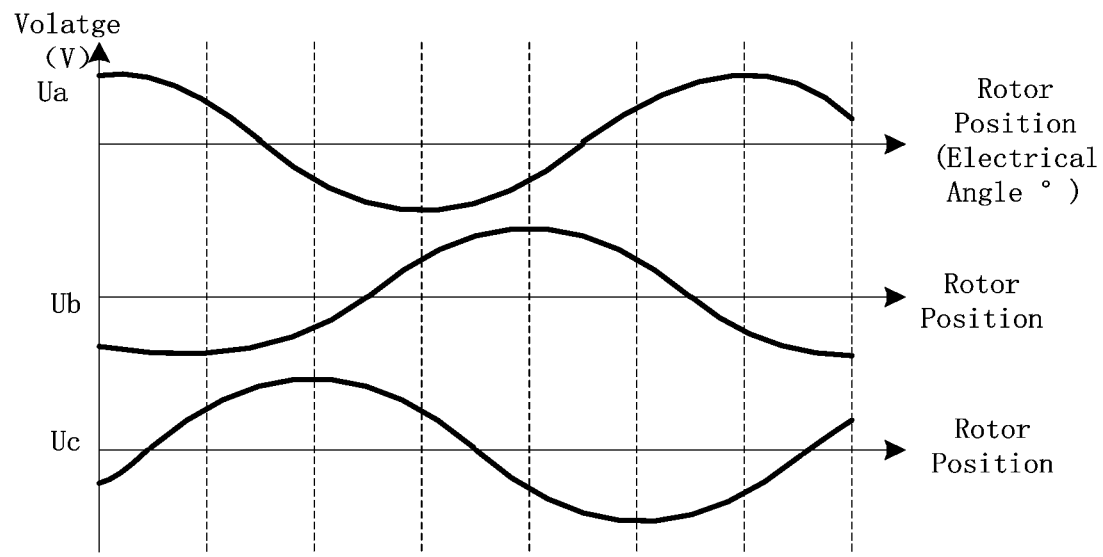
FIG. 5 is a curve graph showing the input voltage to each phase of a power tool according to an example, the voltage curve is approximately a sine wave.
Figure 6:
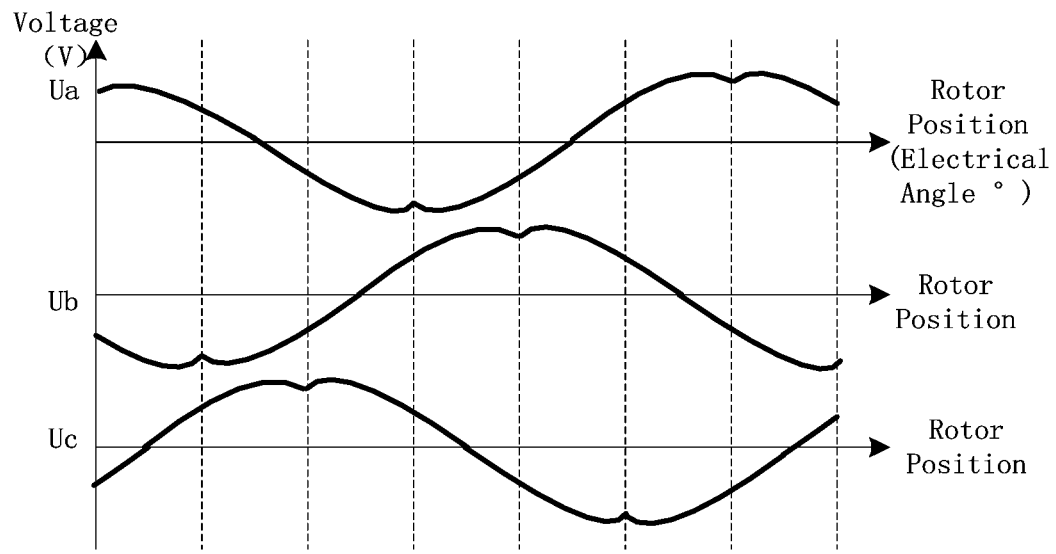
FIG. 6 is a curve graph showing the input voltage to each phase of a power tool according to another example, the voltage curve is approximately a saddle-shaped wave.

Referring to FIG. 3, the signal processing module 211 of the controller 21 can perform a series of processing to generate PWM signals based on the sampled current of the motor and output the generated PWM signals to the power driving module 212, so as to output corresponding drive signals to control the drive circuit 22 to work. At least one switching element of the drive circuit 22 changes the on-off state, so that the voltage input to the motor is approximately a sine wave (FIG. 5) or a saddle-shaped wave (FIG. 6). Such currents can be compounded into multiple vector torques with approximately continuous directions, and the rotor of the motor follows and rotates synchronously with these multiple vector torques that move approximately along the circumference, thereby improving the efficiency of the whole machine, and increasing the output speed under the same torque. Among them, FIGS. 5 and 6 are only diagrams of the relationship between the voltage of each phase of the motor (Ua, Ub, Uc) and the rotor position, wherein the phase difference of the voltage of each phase is 120 degrees. Similarly, the current of each phase of the motor and the rotor position are also approximately sine waves, wherein the phase difference of the current of each phase is 120 degrees. In other words, the direction and magnitude of the voltage or current input to each phase of the motor 13 all follow the change of the rotor position.

In order to achieve the above purpose, in an example, the signal processing module 211 mainly includes: a current calculation unit 311, a first coordinate transform unit 312, a second coordinate transform unit 313, a speed and position estimation unit 314, a speed comparison and adjustment unit 315, a first current comparison and adjustment unit 316, a second current comparison and adjustment unit 317, a second coordinate inverse transform unit 318, a first coordinate inverse transform unit 319, a PWM signal generation unit 320, and a target speed setting unit 321.

The signal processing module 211 can obtain a first feedback current Iq and a second feedback current Id based on the sampled current of the motor 13. The first feedback current Iq is related to the motor torque. The second feedback current Id is related to the stator magnetic field strength.

The speed and position estimation unit 314 is configured to estimate the current speed of motor 13 based on the sampled current of motor 13. The target speed setting unit 321 is configured to set the target speed of the motor 13. The speed comparison and adjustment unit 315 is configured to compare the current speed of the motor 13 to the target speed of the motor 13, and make adjustments based on the comparison result to obtain a first target current Iq* and/or a second target current Id*.

The first current comparison and adjustment unit 316 is configured to compare the first feedback current Iq with the first target current Iq* and make adjustments based on the comparison result to obtain a first target voltage Vq. The second comparison and adjustment unit 317 is configured to compare the second feedback current Id with the second target current Id* and obtain a second target voltage Vd based on the comparison result.

Figure 4:
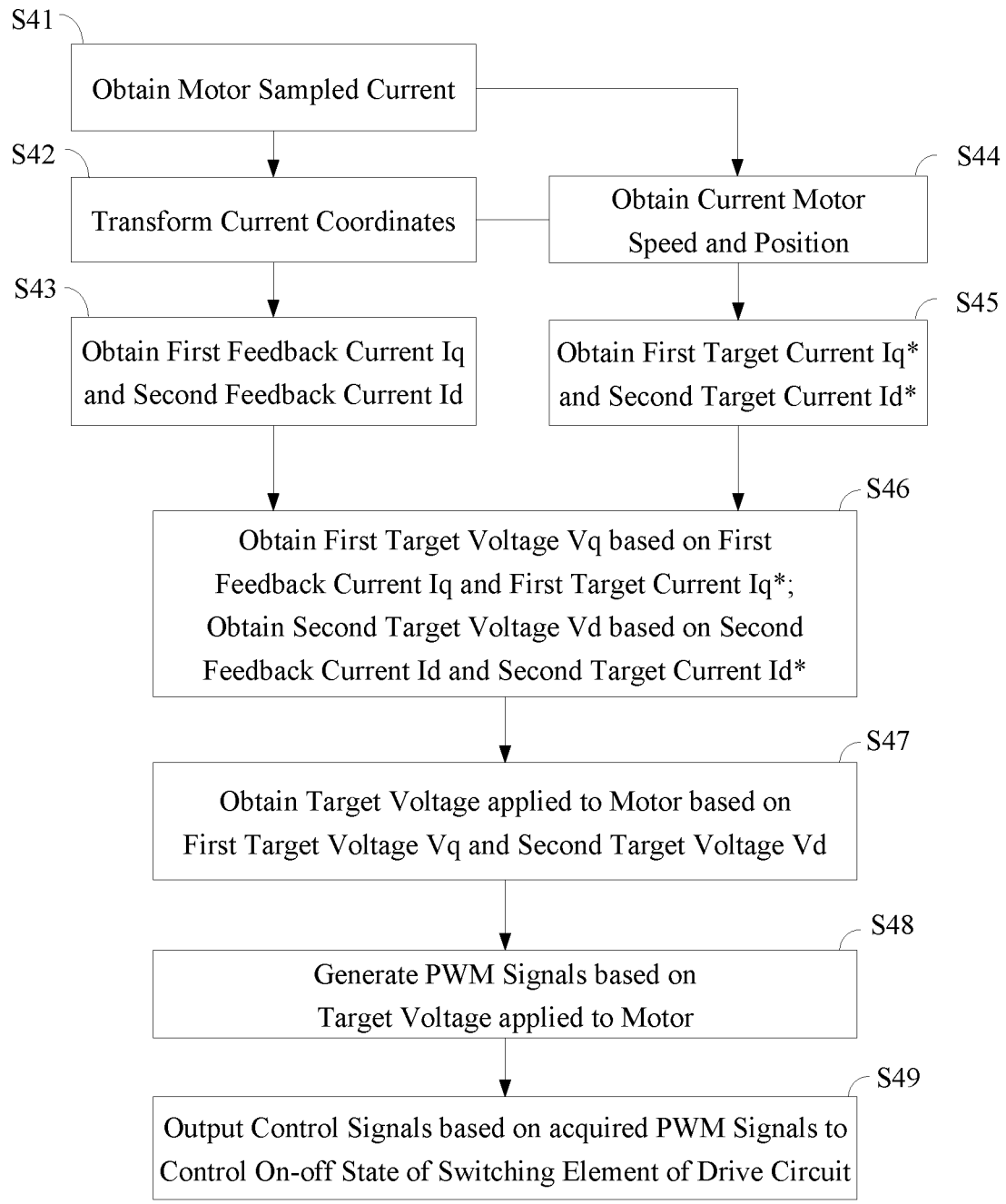
FIG. 4 is a flowchart of a control method of a power tool according to the first example.

Referring to FIGS. 3 and 4, the controller 21 controls the motor with a method comprising the following steps:

S41: Obtain the sampled current and the target speed of the motor 13;

The controller 21 obtains the sampled current signals of the motor from the current detection module 24, and the sampled current may be bus current or phase current. After obtaining the sampled current signals of the motor, the controller 21 calculates the sampled current of the motor. Specifically, the current three-phase current of the motor is calculated by the current calculation unit 311. The target speed of the motor 13 is obtained from the target speed setting unit 321, and its value is operatively set by the user.

S42: Transform current coordinates;

After the current calculation unit 311 calculates the three-phase current, it is transmitted to a coordinate transform unit to transform current coordinates, in order to obtain the first feedback current Iq and the second feedback current Id.

In one example, the coordinate transform unit includes the first coordinate transform unit 312, which transforms a three-phase alternating current calculated by the current calculation unit 311 into a two-phase alternating current; and the second coordinate transform unit 313, which transforms the two-phase alternating current obtained by the first coordinate transform unit 312 into a two-phase direct current, wherein the two-phase direct current is the first feedback current Iq and the second feedback current Id, respectively.

In one example, the first coordinate transform unit 312 adopts Clark transformation, and the second coordinate transform unit 313 adopts Park transformation.

S43: Obtain the first feedback current Iq and the second feedback current Id;

Through the coordinate transform unit, the controller 21 can obtain two feedback currents, the first feedback current Iq and the second feedback current Id. The first feedback current Iq and the second feedback current Id are perpendicular to each other. In this way, the signal processing module 211 obtains the first feedback current Iq and the second feedback current Id based on the sampled current of the motor 13, wherein the first feedback current Iq is torque current, which is related to the torque of the motor, and the second feedback current Id is excitation current, which is related to the magnetic field strength of the stator.

S44: Obtain the current speed and position of the motor;

The speed and position estimation unit 314 obtains the current speed $\omega$ and/or the rotor position of the motor through calculation based on the obtained sampled current of the motor and some parameters obtained in the coordinate transformation process.

S45: Obtain the first target current Iq* and the second target current Id*;

The first target current Iq* and the second target current Id* can either be determined by calculation or be directly given. The first target current Iq* is torque current, which is used to control torque, generate a torque perpendicular to the rotor, and drive the rotor to rotate to the maximum. The second target current Id* is excitation current, which is used to control the magnetic field strength.

In an example, the method for obtaining the first target current Iq* is as follows: the speed comparison and adjustment unit 315 compares and adjusts the acquired current speed $\omega$ of the motor with the set target speed w* and generates the first target current Iq*. The first target current Iq* can be used to control the speed of the motor to reach the target speed w* as quickly and stably as possible. The principle is to use the torque current to control the torque so that it can drive the rotor to the maximum. Optionally, the speed comparison and adjustment unit 315 includes a PI controller, and the speed comparison and adjustment unit 315 uses the PI adjustment method to make adjustments based on the comparison result between the current motor speed $\omega$ and the target speed w* to obtain the first target current Iq*.

The first target current Iq* can control the torque, and the second target current Id* can control the magnetic field strength. In order to improve the efficiency and torque of the whole machine, the first target current Iq* needs to be as large as possible. Since the first target current Iq* and the second target current Id* are actually obtained by decoupling the actual motor current, if the first target current Iq* is to be as large as possible, the second target current Id* should be as small as possible. Therefore Id*=0.

S46: Obtain the first target voltage Vq and the second target voltage Vd;

The first current comparison and adjustment unit 316 obtains the first target voltage Vq based on the first feedback current Iq and the first target current Iq*. Optionally, the first current comparison and adjustment unit 316 includes a PI controller, and the first current comparison and adjustment unit 316 uses the PI adjustment method to make adjustments based on the comparison result of the first feedback current Iq and the first target current Iq* to generate the first target voltage Vq; the first target voltage Vq can make the first feedback current Iq of the motor reach the first target current Iq* as quickly and stably as possible, and the first target current Iq* can be used to control the motor speed to reach the target speed $\omega$* as quickly as possible.

The second current comparison and adjustment unit 317 obtains the second target voltage Vd based on the second feedback current Id and the second target current value Id*. Wherein, the second target current value Id*=0. Optionally, the second current comparison and adjustment unit 317 adopts the PI adjustment method to make adjustments based on the comparison result of the second feedback current Id and the second target current Id* to generate the second target voltage Vd; the second target voltage Vd can make the second feedback current Id of the motor reach the second target current Id* as quickly and stably as possible.

S47: Obtain a target voltage applied to the motor based on the first target voltage Vq and the second target voltage Vd;

The target voltage applied to the motor is obtained by performing coordinate transformation on the acquired first target voltage Vq and second target voltage Vd.

Specifically, the obtained first target voltage Vq and the second target voltage Vd are converted from two-phase direct current to two-phase alternating current by the second coordinate inverse transform unit 318. Specifically, the second coordinate inverse transform unit 318 uses the Park inverse transform method to convert the first target voltage Vq and the second target voltage Vd from two-phase direct current to two-phase alternating current Va and Vb.

Further, the first coordinate inverse transform unit 319 transforms the two-phase alternating current Va and Vb obtained by the second coordinate inverse transform unit 318 to transform the two-phase alternating current voltage into a three-phase alternating current voltage. The three-phase alternating current voltage is the target voltage applied to the motor, and the target voltage is approximately a sine wave or a saddle-shaped waveform.

S48: Generate PWM signals based on the acquired target voltage applied to the motor to control the drive circuit;

The PWM signal generation unit 320 generates PWM signals based on the acquired target voltage applied to the motor 13, the PWM signals are used for controlling the on-off state of the corresponding switching element of drive circuit 22.

S49: Output control signals based on the acquired PWM signals to control the on-off state of the switching element of the drive circuit;

The PWM signals generated by the PWM signal generation unit 320 are transmitted to the power driving module 212. The power driving module 212 enhances the driving capability of PWM signals; with enhanced driving capability, the control signals are output to control terminal of each switching element of the drive circuit 22, thereby controlling the on-off state of each switching element. The on-off state and on-off time of each switching element controls the voltage output by the power supply device 20 to the motor. Said voltage is approximately a sine wave or a saddle-shaped wave. This way the motor is operated by the control method of the controller 21.

With this control method, the voltage input to the motor can be approximately a sine wave or a saddle-shaped wave. Compared with the traditional square wave control method, the noise is relatively small, the torque fluctuation is small, the heavy load efficiency is high, and the dynamic response is good.

In the above control method, since the torque current (i.e. the second target current Id*) is directly given, the target excitation current (i.e. the first target current Iq*), the torque obtained in this way is not the largest, and the efficiency is not the highest, it cannot meet the requirements in some heavy load situations. In order to further improve the efficiency and torque of the whole machine, in the second example, the first target current Iq* and the second target current Id* are allocated to maximize the torque per unit current.

Figure 7:
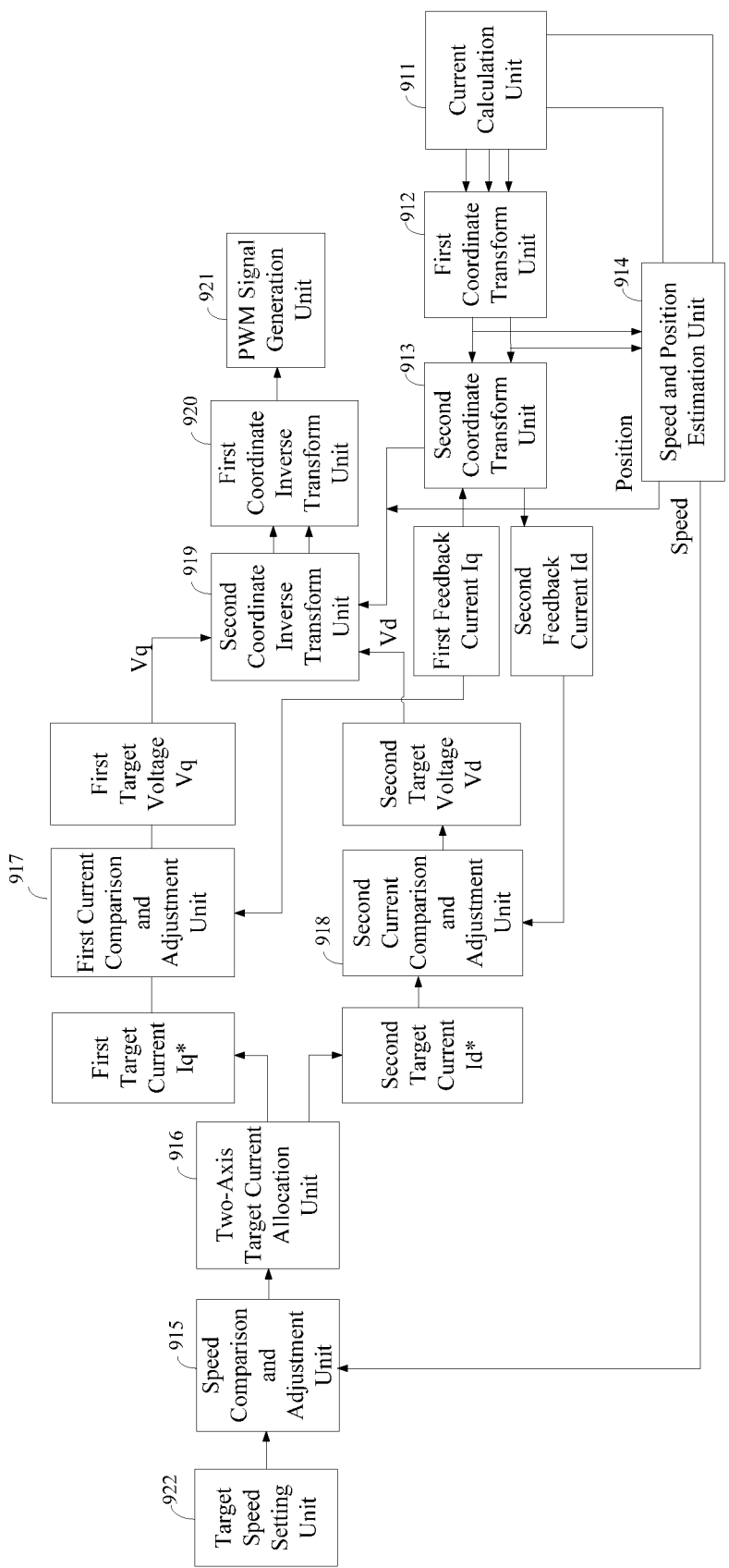
FIG. 7 is a signal processing module of a controller of a second example.

Referring to FIG. 7, the signal processing module of a second example is similar to the aforementioned first example (FIG. 3). The difference is that a two-axis target current allocation unit 916 is newly added after the speed comparison and adjustment unit 915. Based on the comparison and adjustment results of the target speed and the current speed of the motor, the two-axis target current allocation unit 916 can make a reasonable allocation of the first target current Iq* and the second target current Id*, so that the torque per unit current is maximized, thereby improving the torque and the whole machine efficiency.

In this example, the signal processing module includes: a current calculation unit 911, a first coordinate transform unit 912, a second coordinate transform unit 913, a speed and position estimation unit 914, a speed comparison and adjustment unit 915, and a first current comparison and adjustment unit 917, a second current comparison and adjustment unit 918, a second coordinate inverse transform unit, a first coordinate inverse transform unit, a PWM signal generation unit 924, and a target speed setting unit 922. The above-mentioned units of the signal processing module are the same as or similar to those of the aforementioned first example and will not be repeated here. The difference is that the signal processing module of this example also includes a two-axis target current allocation unit 916, which is configured to allocate the first target current Iq* and the second target current Id* based on the result of the speed comparison and adjustment unit 915 so as to obtain maximum torque per unit current.

Figure 8:
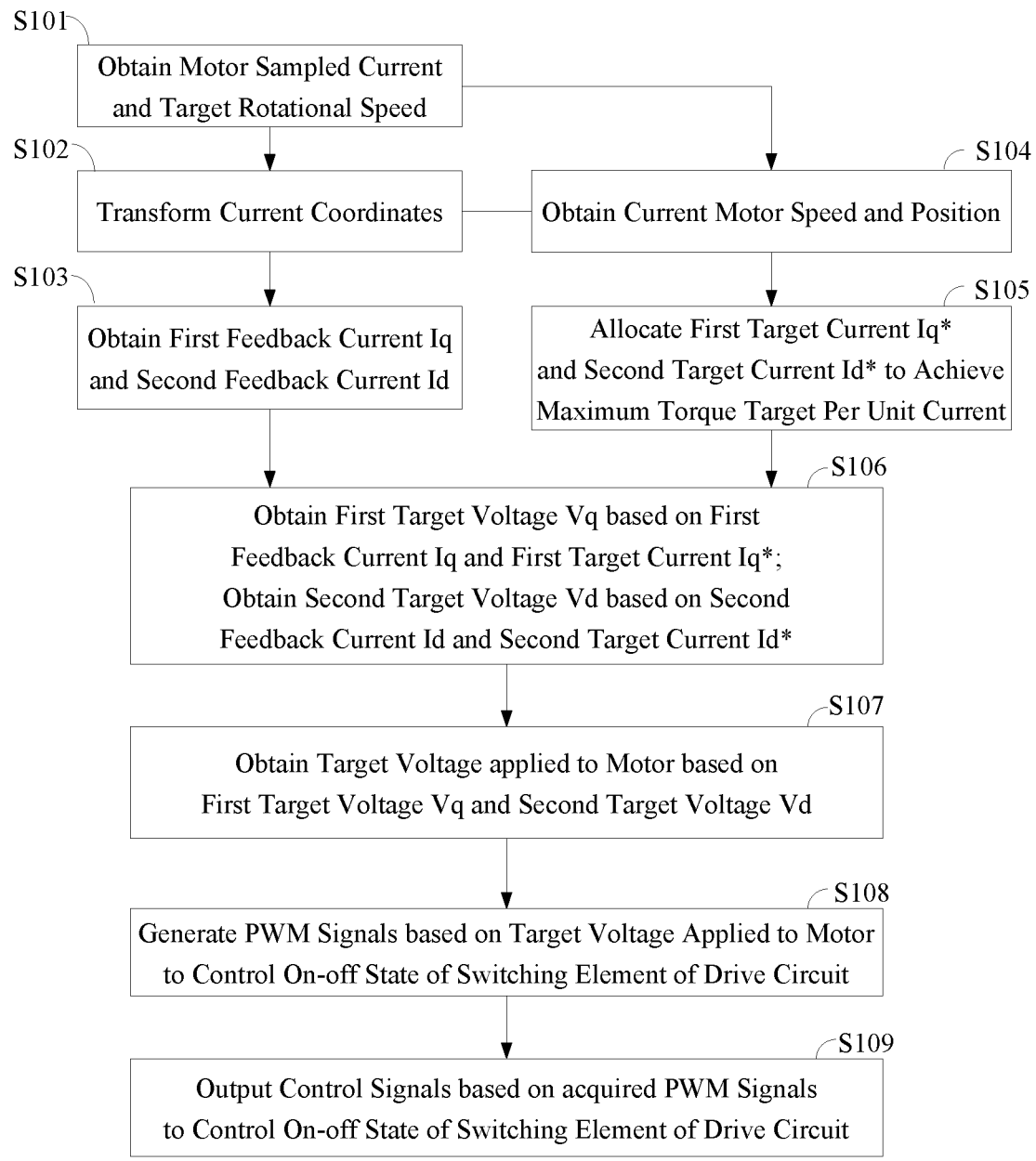
FIG. 8 is a flowchart of a control method of a power tool according to the second example.

Referring to FIG. 8, the method steps for the controller 21 to control the motor 13 include steps S101 to S109, which are similar to those of the first example (FIG. 4), except that in step S105, instead of the second target current Id* in the aforementioned example being directly set to zero, the first current target Iq* and the second target current Id* are allocated in order to achieve maximum torque per unit current. This example comprehensively considers the excitation current and the torque current, and automatically allocates the first current target Iq* and the second target current Id* in order to achieve the maximum torque target per unit current, so that under the same output torque, the output speed increases and the input current decreases, the efficiency of the whole machine improves, and the heavy load current is small.

Figure 9:
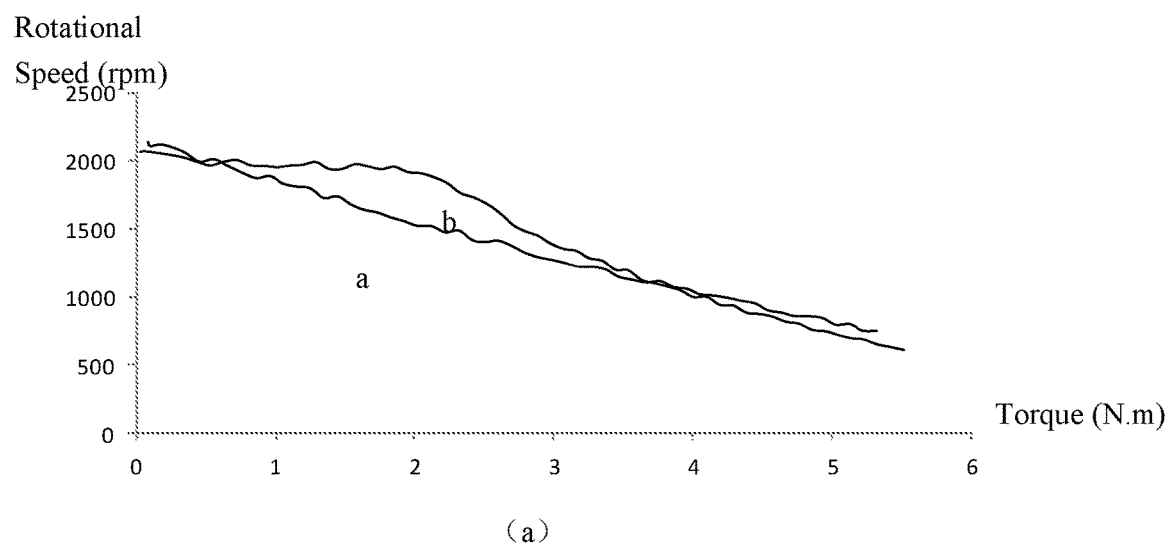
FIG. 9 is an effect comparison diagram of the control method of the second example and the traditional square wave control method.
Figure 9:
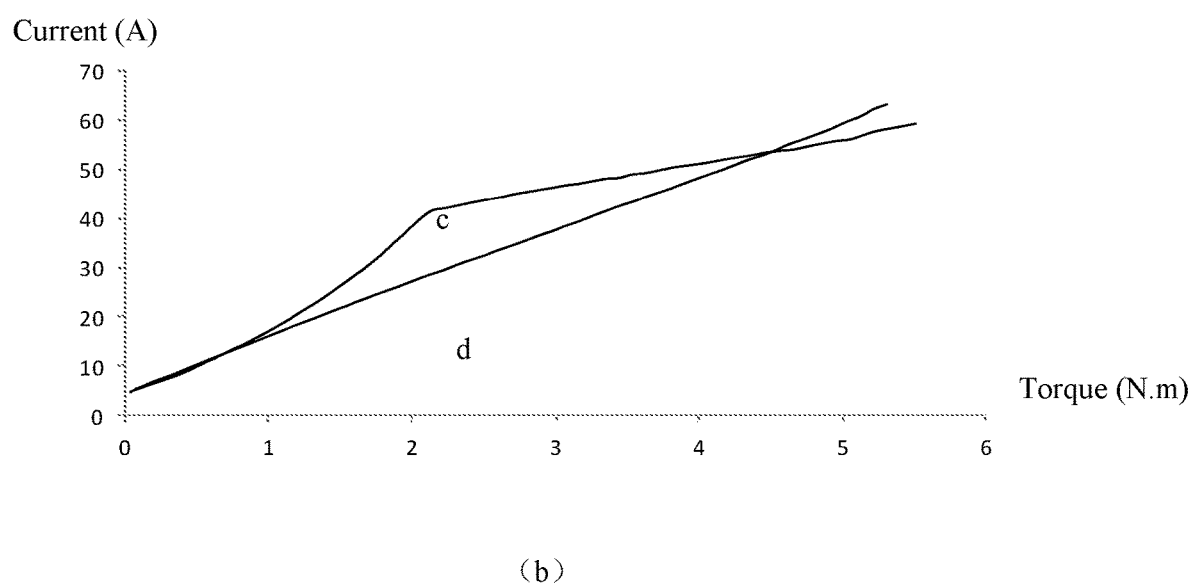

Referring to FIG. 9, graph (a) is a curve graph of rotational speed versus torque, wherein a is the result curve of the control method adopted in this example; b is the result curve of the traditional square wave control method. Graph (B) is a curve graph of motor current versus torque, wherein, c is the result curve of the control method adopted in this example; d is the result curve of the traditional square wave control method. It can be seen from graph (a) and (b) that the control method of this example results in wider motor constant speed region, higher overall machine efficiency, and smaller current under heavy load. With this example, for electric drills, the nailing efficiency is higher; for circular saws and angle grinders, the heavy-duty capability is stronger; for low-power grinding type power tools, the noise is reduced and the overall performance is improved.

In some cases, higher speed may be desired, for example, in high-speed drilling. In this case, it may happen that the voltage applied to the motor has reached the maximum allowable voltage allowed by the power supply device 20 and the power tool 10, and in the first current comparison and adjustment unit (316, 917) in the aforementioned examples, the PI controller is saturated, but the speed of the motor 13 still does not reach the target speed. In order to solve this problem, in a third example of the present disclosure, a motor control method is provided. After the voltage applied to the motor has reached the maximum allowable voltage Umax allowed by the power supply device 20 and the power tool 10, the speed or load of the motor can continue to increase, increasing the speed to the maximum while improving the efficiency of the whole machine at the same time.

Figure 10:
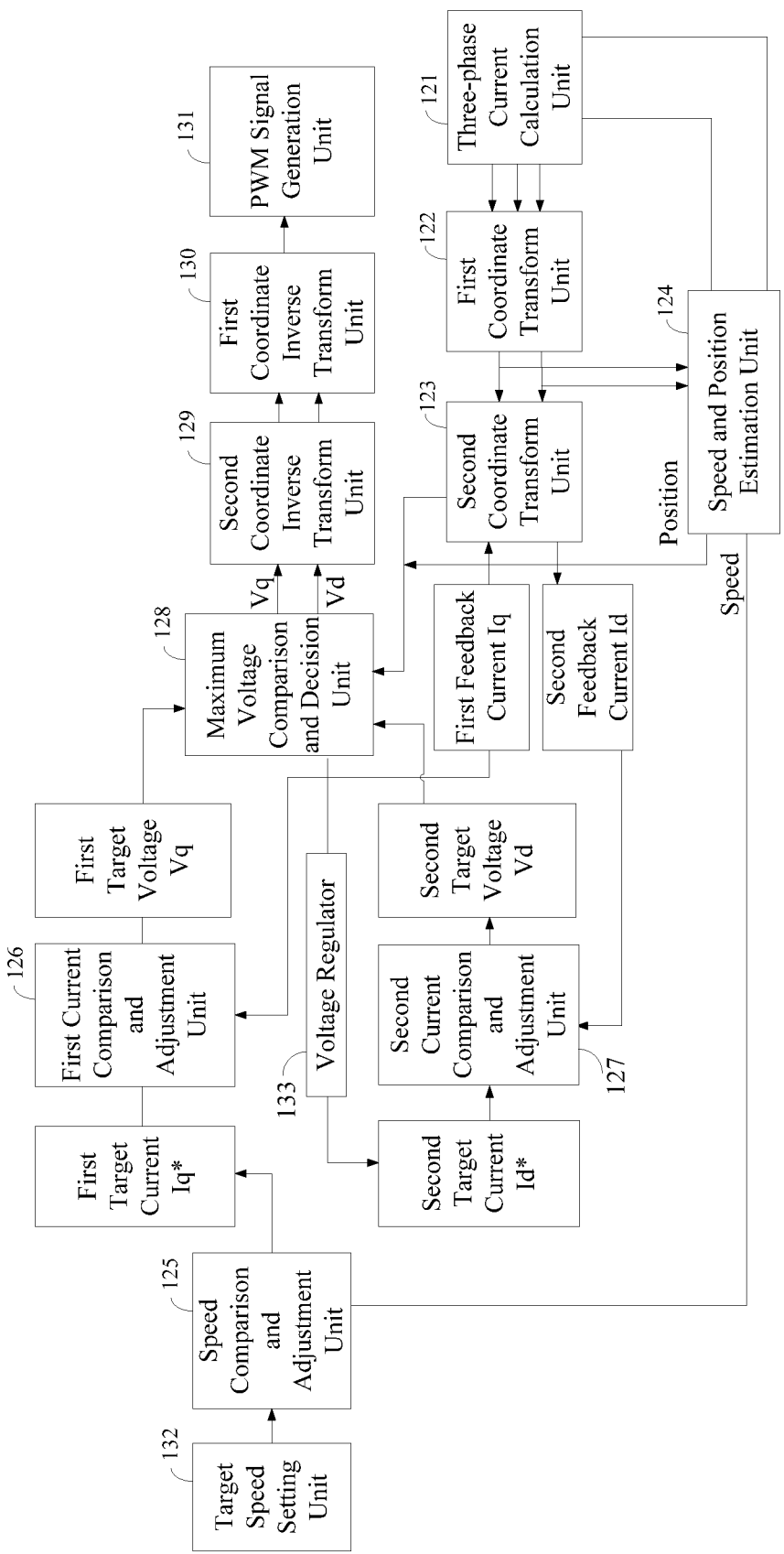
FIG. 10 is a signal processing module of a controller of a third example.

Referring to FIG. 10, the signal processing module of the present example includes: a current calculation unit 121, a first coordinate transform unit 122, a second coordinate transform unit 123, a speed and position estimation unit 124, and a speed comparison the adjustment unit 125, a first current comparison and adjustment unit 126, a second current comparison and adjustment unit 127, a second coordinate inverse transform unit 129, a first coordinate inverse transform unit 130, a PWM signal generation unit 131, and a target speed setting unit 132.

The signal processing module of this example is similar to the first example (FIG. 3), except adding a maximum voltage comparison the decision unit 128, which is used to generate the target voltage based on the combination of the first target current Vq and the second target voltage Vd. The target voltage value is compared and judged with the maximum allowable voltage Umax allowed by the power supply device 20 and the power tool 10, and the second target current Id* is adjusted based on the decision result so that the second target current Id* is less than zero.

In this way, after the voltage applied to the motor has reached the maximum allowable voltage Umax allowed by the power supply device 20 and the power tool 10, the speed or load of the motor can continue to increase, increasing the speed to the maximum while improving the efficiency of the whole machine at the same time.

Of course, the maximum allowable voltage Umax can also be artificially defined, as long as it is less than or equal to the maximum voltage that the power supply device can output.

Figure 11:
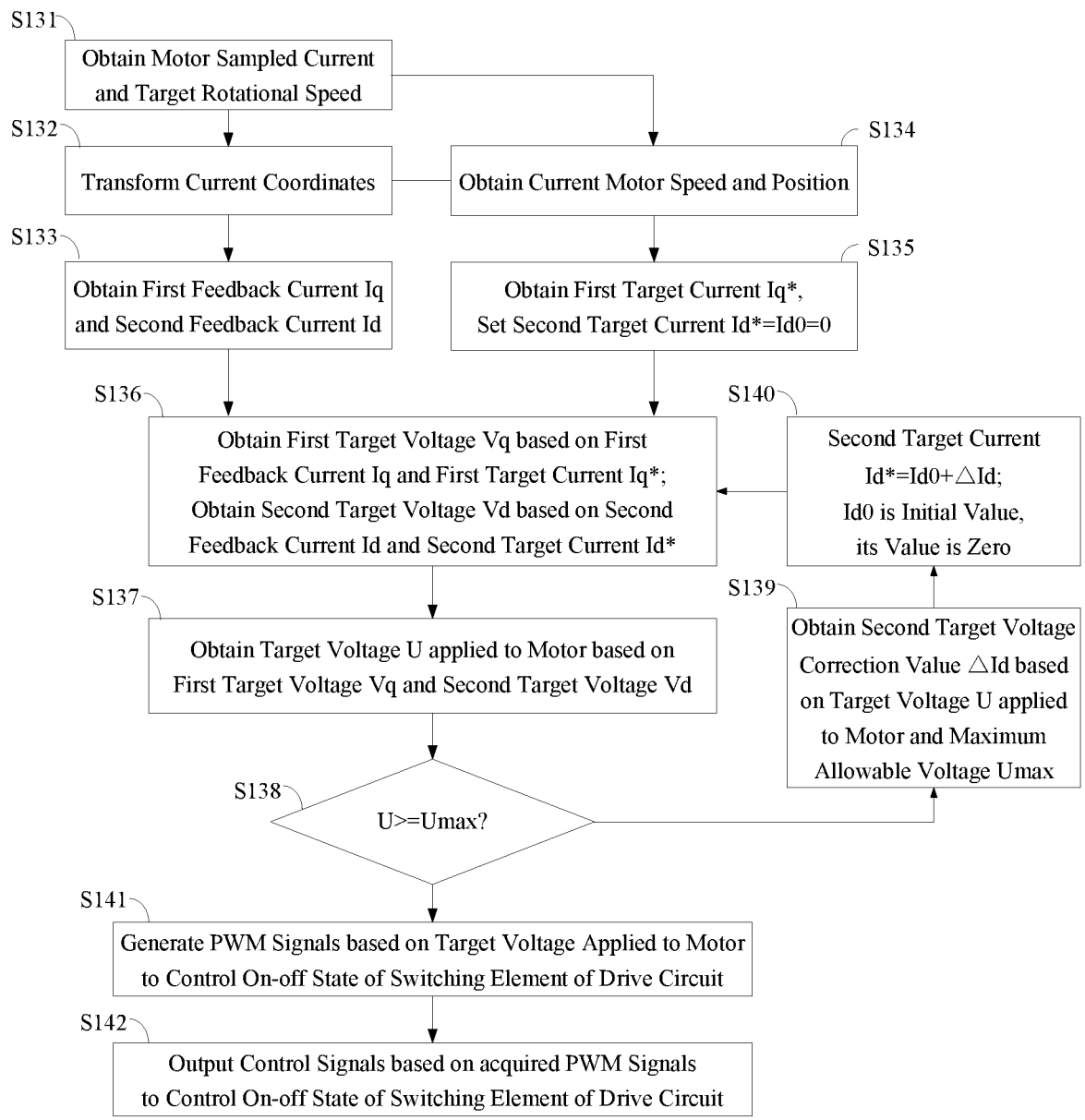
FIG. 11 is a flowchart of a control method of a power tool according to the third example.

Referring to FIG. 11, in this example, the method for the controller 21 to control the motor is executed as the following steps:

S131: Obtain the sampled current and the target speed of the motor;

S132: Transform current coordinates;

S133: Obtain the first feedback current Iq and the second feedback current Id;

S134: Obtain the current speed and position of the motor;

The specific contents of the above steps S131 to S134 are the same as the steps S41 to S44 in the first example and will not be repeated here.

S135: Obtain the first target current Iq*, and set the second target current Id*=Id0=0;

Wherein, the method of obtaining the first target current Iq* is the same as the first example described above. That is, the first target current Iq* is generated by making adjustment based on the comparison result of the current speed ω and the target speed w* of the motor. The initial value of the second target current Id* is set as Id0=0.

S136: Obtain the first target voltage Vq and the second target voltage Vd;

The first current comparison and adjustment unit 126 obtains the first target voltage Vq based on the first feedback current Iq and the first target current Iq*. Optionally, the first current comparison and adjustment unit 126 includes a PI controller, and the first current comparison and adjustment unit 126 uses the PI adjustment method to make adjustments based on the comparison result of the first feedback current Iq and the first target current Iq* to generate the first target voltage Vq.

The second current comparison and adjustment unit 127 obtains the second target voltage Vd based on the second feedback current Id and the second target current value Id*. Wherein, the initial value of the second target current is set as Id*=Id0=0. Optionally, the second current comparison and adjustment unit 118 adopts the PI adjustment method to make adjustments based on the comparison result of the second feedback current Id and the second target current Id* to generate the second target voltage Vd.

S137: Obtain the target voltage U based on the first target voltage Vq and the second target voltage Vd;

The maximum voltage comparison and decision unit 128 obtains the target voltage U by calculation from the acquired first target voltage Vq and the second target voltage Vd. As an example, $U=\sqrt{Vq^2+Vd^2}$.

S138: Determine whether the target voltage U is greater than or equal to the maximum allowable voltage Umax;

The maximum voltage comparison and decision unit 128 compares the calculated target voltage U with the maximum allowable voltage Umax, if U is greater than or equal to Umax, then go to step S139, if not, go to step S141.

S139: Obtain a second target voltage correction value ΔId based on the target voltage U applied to the motor and the maximum allowable voltage Umax.

Specifically, a voltage regulator 133 performs PI adjustments based on the comparison result of Umax and U in order to obtain the correction value of the second target current Id*, and the correction value ΔId is less than zero.

S140: Obtain the second target current Id* from calculation;

Based on ΔId and Id*=Id0+ΔId, calculate the second target current Id*. Among them, Id0 is the initial value, and its value is zero. Then go to step 136.

S141: Generate PWM signals based on the acquired target voltage applied to the motor to control the switching element of the drive circuit;

S142: Output control signals based on the acquired PWM signals to control the on-off state of the switching element of the drive circuit.

Figure 12:
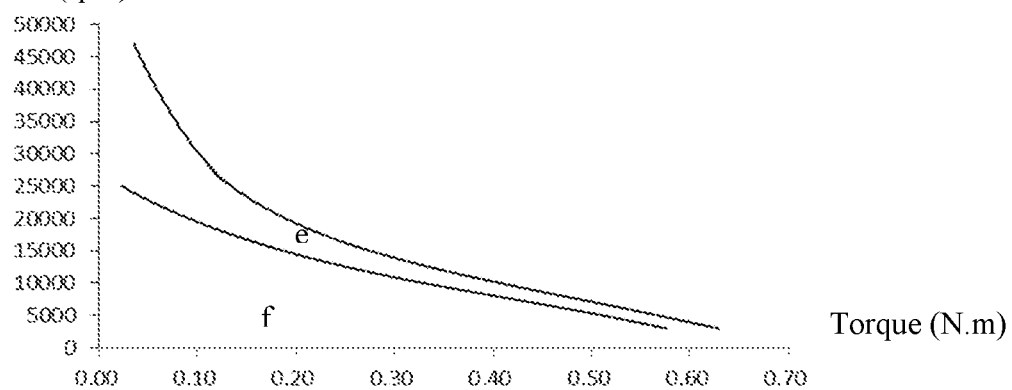
FIG. 12 is an effect comparison diagram of the control method of the third example and the traditional square wave control method.
Figure 12:
Figure 12:
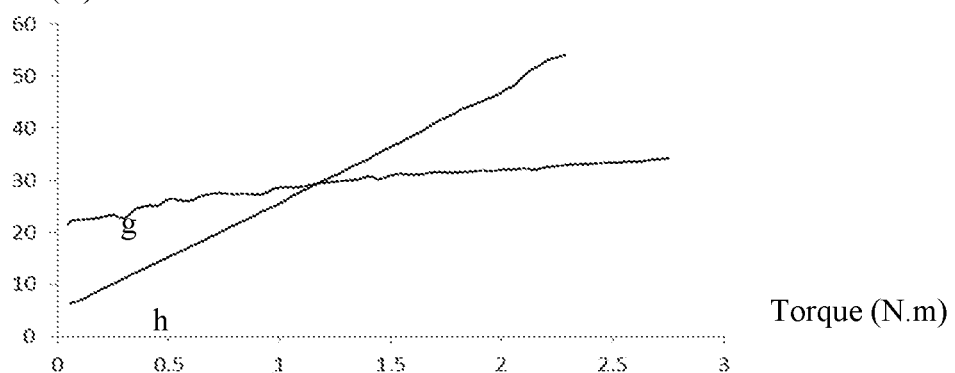

FIG. 12 shows the comparison between the aforementioned control method and the traditional square wave control method. Graph (a) is a curve graph of speed versus torque, wherein e is the result curve of the control method adopted in this example, and f is the result curve of the traditional square wave control method. It can be seen from graph (a) that, compared with the traditional square wave control method, the speed-up effect of the aforementioned control method is obvious: if the square wave control is adopted, the speed is n when PWM=100%. If the aforementioned control method is adopted, the speed can be increased to 1.3n~3n. Graph (b) is a curve graph of efficiency versus torque, wherein g is the result curve of the control method adopted in this example, and f is the result curve of the traditional square wave control method. It can be seen from graph (b) that, under heavy load, the aforementioned control method makes the efficiency of the power tool 10 higher than that of the traditional square wave control. Graph (c) is a curve graph of current versus torque, wherein g is the result curve of the control method adopted in this example, and h is the result curve of the traditional square wave control method. It can be seen from graph (c) that, compared with the traditional square wave control method, outputting the same torque under heavy load, the control method of this example makes the motor current smaller.

The basic principles, main features and advantages of the present disclosure have been shown and described above. Those skilled in the art should understand that the foregoing examples do not limit the present disclosure in any form, and all technical solutions obtained by equivalent substitutions or equivalent transformations fall within the protection scope of the present disclosure.

In view of the foregoing, it will be appreciated that, with respect to industrial applicability, the present disclosure provides a power tool and a control method thereof, which enable the power tool to have small torque fluctuations, high heavy-load efficiency, and good dynamic response.

What is claimed is:

1. A power tool, comprising:
    a tool element;
    a motor, having a rotor, operatively connected with the tool element by a tool attachment shaft and configured to output power to drive the tool element to work;
    a handle;
    an operating member, provided in the handle, configured to start or stop the motor;
    a current detection module for repeatedly detecting sampled currents of the motor;
    a drive circuit electrically connected to the motor for driving the motor to output power; and
    a controller electrically connected to the drive circuit for outputting control signals to control the drive circuit;
    wherein the controller is configured to output a control signal that varies with a change of a position of the rotor to control the drive circuit, the position of the rotor calculated based on the repeatedly detecting sampled current of the motor detected by the current detection module so that at least one of an input voltage or a current of the motor varies approximately in a saddle-shaped wave, the controller comprises a signal processing module, the signal processing module is configured to obtain a first feedback current and a second feedback current based on all of the sampled currents of the motor, the first feedback current is related to a torque of the motor, and the second feedback current is related to a magnetic field strength of a stator,
    wherein the signal processing module is configured to estimate a current speed of the motor based on all of the sampled currents of the motor, to set a target speed of the motor, and to compare the current speed of the motor with the target speed of the motor and make adjustments based on a comparison result to obtain at least one of a first target current or a second target current, and
    wherein the target speed is in the range of 1.3 to 3.0 times the speed of a square wave control signal.

2. The power tool of claim 1, wherein the signal processing module is configured to, based on the comparison result, automatically allocate the first target current and the second target current following a principle of maximum torque per unit current.

3. The power tool of claim 1, wherein the signal processing module is configured to compare the first feedback current with the first target current and make adjustments based on the comparison result to obtain a first target voltage and configured to compare the second feedback current with the second target current and make adjustments based on the comparison result to obtain a second target voltage.

4. The power tool of claim 3, wherein the signal processing module is configured to generate a target voltage applied to the motor based on the first target voltage and the second target voltage, compare the target voltage with a maximum allowable voltage, and, based on the comparison result, determine whether the target voltage is greater than or equal to the maximum allowable voltage; and configured to, when the target voltage is greater than or equal to the maximum allowable voltage, make voltage adjustments based on the comparison result to obtain the second target current and output the second target wherein the second target current is less than zero.

5. A control method of a power tool comprised of a motor, having a rotor and a stator, configured to output power to drive a tool element, a handle comprising an operating member operably coupled to start or stop the motor, a current detection module for detecting sampled current of the motor, a drive circuit electrically connected to the motor for driving the motor to output power, and a controller electrically connected to the drive circuit for outputting control signals to control the drive circuit, the control method comprising:
    setting a target speed of the motor;
    repeatedly detecting the sampled current of the motor;
    calculating a change of a position of the rotor relative to the stator based on all the sampled currents of the motor, outputting control signals that vary with the change of the position of the rotor to control the drive circuit such that at least one of an input voltage or a current of the motor varies approximately in a saddle-shaped wave;
    obtaining a first feedback current related to a torque of the motor and a second feedback current related to a magnetic field strength of the stator based on the sampled current of the motor;
    estimating a current speed of the motor based on all the sampled currents of the motor or detecting the current speed of the motor based on a speed detection device;
    obtaining at least a first target current based on the current speed and the target speed of the motor, the first target current being related to the torque of the motor;
    obtaining a second target current, the second target current being related to the magnetic field strength of the stator;
    obtaining a first target voltage based on the first feedback current and the first target current;
    obtaining a second target voltage based on the second feedback current and the second target current;
    obtaining a target voltage applied to the motor based on the first target voltage and the second target voltage; and
    generating PWM signals based on the target voltage applied to the motor to control the drive circuit,
    wherein the target speed is in the range of 1.3 to 3.0 times the speed of a square wave control signal.

6. The control method of claim 5, further comprising performing comparison and adjustments based on the current speed and the target speed of the motor and allocating the first target current and the second target current to achieve maximum torque per unit current based on a result of comparison and adjustments.

7. The control method of claim 6, further comprising comparing and determining whether the target voltage applied to the motor is greater than or equal to a maximum allowable voltage allowed by a power supply device that powers the power tool and when the target voltage is greater than or equal to the maximum allowable voltage, causing adjustments performed to be based on a result of the comparison between the target voltage and the maximum allowable voltage to obtain the second target current and wherein the second target current is less than or equal to zero.

* * * * *